United States Patent [19]

Markovitz

[11] Patent Number: 4,656,090
[45] Date of Patent: Apr. 7, 1987

[54] LOW VISCOSITY EPOXY RESIN COMPOSITIONS

[75] Inventor: Mark Markovitz, Schenectady, N.Y.

[73] Assignee: General Electric Company, Schenectady, N.Y.

[21] Appl. No.: 833,303

[22] Filed: Feb. 25, 1986

Related U.S. Application Data

[62] Division of Ser. No. 658,102, Oct. 5, 1984, Pat. No. 4,603,182.

[51] Int. Cl.⁴ .................. B32B 27/38; D02G 3/00
[52] U.S. Cl. ........................... 428/364; 428/363; 428/375; 428/377; 428/413; 428/417; 428/418
[58] Field of Search ............... 428/364, 375, 377, 413, 428/418, 417

[56] References Cited

U.S. PATENT DOCUMENTS 4,113,791  9/1978  Smith et al. .............. 525/481 X
4,173,593  11/1979  Smith et al. .............. 525/529 X Primary Examiner—Theodore E. Pertilla
Attorney, Agent, or Firm—Jerome C. Squillaro

[57] ABSTRACT

The viscosities of solventless compositions of epoxy resins containing 1, 2 epoxy groups and having at least two epoxide groups per molecule and effective amounts of catalytic hardener and phenolic accelerator are dramatically reduced to make them useful for vacuum-pressure impregnation and also for pre-impregnated insulating material applications by addition of 3–33% of reactive diluent such as styrene.

2 Claims, 2 Drawing Figures

LOW VISCOSITY EPOXY RESIN COMPOSITIONS

This is a division of application Ser. No. 658,102, filed 10/5/84, now U.S. Pat. No. 4,603,182.

FIELD OF THE INVENTION

This invention relates generally to epoxy resin technology and is more particularly concerned with novel epoxy resin compositions having special utility in electrical insulation applications because of their uniquely low viscosities, long shelf lives and good electrical properties, and with electrical conductor-covering materials impregnated with these compositions and with electrical conductors electrically insulated with the said novel compositions.

BACKGROUND OF THE INVENTION

In the manufacture of electrical equipment, electrical insulation is provided in the form of glass fabric, thermoplastic film, and mica paper or mica flake tapes which are impregnated with curable polymeric materials. The fabric, film, paper or tape or other suitable form is either treated with polymeric material before application to a conductor, i.e., pre-impregnated, or afterward as by the vacuum-pressure impregnation technique employed in the production of coils for motors and generators. In either case, the resin composition must be applied and cured in place without voids which reduce useful life of the insulation as a result of breakdown under electrical stress. For this reason, the resin composition must be effectively solvent free and at that same time it must be of relatively low viscosity for easy flow around and between the laps of insulating tape of a coil and for similarly efficient penetration in the preparation of pre-impregnated materials. While relatively low viscosities are less critical for preparing pre-impregnated insulation because the impregnation temperature can be increased to decrease viscosity, the tendency towards reaction or gelation at such elevated temperatures precludes the use of some otherwise desirable high viscosity compositions from use for pre-impregnated insulation.

Epoxy resins are usually preferred to polyester resins because of their substantially superior characteristics of thermal stability, adhesion, tensile, flexural and compressive strengths, resistance to solvents, oils, acids and alkalis. However, the viscosity of these resins typically run the order of 4,000 to 6,000 centipoises (cps) and worse, when certain hardeners are added, their viscosities run to the range of 7,000 to 20,000 cps which is much too high for useful impregnation purposes. While viscosity of that sort can be reduced substantially through the use of certain epoxy diluents, attempts along this route in the past have only served to decrease the thermal stability of the compositions and thus result detrimentally to the electrical properties of the cured insulation.

SUMMARY OF THE INVENTION

On the basis of my surprising discovery set forth below, it is now possible to provide epoxy resin compositions having special utility in vacuum-pressure impregnation applications by virtue of their both good thermal stability and low viscosity at 25° C. of the order of less than 3,000 cps and even below 1,000 cps in certain cases. It is also now possible to provide epoxy resin compositions having special utility in the preparation of pre-impregnated insulation because of their good stability at the elevated temperatures to which they must be heated to reduce their viscosities to levels necessary for effective penetration and impregnation. Further, these new results can be consistently obtained without incurring any offsetting disadvantages such as a detrimental effect upon the desired electrical or physical properties of the epoxy resins.

As indicated above, this invention centers in my unexpected finding that there are certain diluent materials which, unlike those such as the epoxy diluents previously unsuccessfully used in attempts to solve this problem, do not diminish thermal stability or any other important property. In particular, I have established that the reactive diluents styrene, alpha-methyl styrene, vinyl toluene, t-butyl styrene, divinyl benzene, diisopropenyl benzene and mixtures thereof are capable of producing these new and important results and advantages of this invention. Vinyl toluene refers to a mixture of the meta- and para-methyl styrene isomers, but a single isomer such as para-methyl styrene may be used. Similarly, t-butyl styrene refers to para-t-butyl styrene or a mixture of the ortho, meta and para isomers. Divinyl benzene and diisopropenyl benzene also refer to one isomer or mixtures of the ortho, meta and para isomers. Further, divinyl benzene may also contain a substantial quantity of ethyl vinyl benzene, a typical analysis of divinyl benzene being 57% divinyl benzene and 38% ethyl vinyl benzene. I have additionally found that these new results and advantages can invariably be obtained when these particular diluents are used individually or together in admixture with the epoxy resin material in amounts from about 3% to 33% of the total compositions.

This invention also is predicated upon the novel concept of cationically polymerizing styrene and other vinyl monomers by organo-metallic compounds which contain only metallic element-to-oxygen primary valence bonds. This is new chemistry previously unknown and unrecognized in the art and it opens the way to the important new results and advantages of this invention. In particular, for example, the present epoxy resin compositions, in contrast to those of the prior art, have special utility in high voltage insulation applications because of their shelf life at room temperature. Thus, being free from the metal-halogen components essential to cationic polymerization reactions of the prior art, the present invention compositions do not have the very high reactivity which results in cure of cycles of the order of one day at 40° C. and seven days at 15° C. In fact, these present new compositions are stable at room temperature for at least one to two years. Also unlike the prior art involving use of styrene as a diluent for modified epoxy resins prereacted with maleic anhydride and which were in a peroxide-catalyzed free radical reaction which is susceptible to sudden and catastrophic viscosity increase, the compositions of this invention do not contain peroxide or acid anhydride. Acid anhydrides in epoxy resins are susceptible to hydrolysis by moisture which forms polyacids and further reduce the shelf life stability.

Those skilled in the art will understand that there are possible applications of this new chemistry in addition to vacuum-pressure impregnation resins and resins for making electrical insulation prepregs, and that those applications include thermosetting resins of the epoxy and polyester classes for production of resin-glass laminations, coating, molding and potting compounds, tooling and the like.

Those skilled in the art will understand that in carrying out this invention it would be preferable to use compositions as base materials which have the best properties of those available in the prior art. Accordingly, it is my preference, as will be described in more detail below, to formulate these compositions on the basis of the disclosures set out in my U.S. Pat. Nos. 3,814,214 and 3,776,978 which describe and claim compositions that stand generally accepted for commercial production. Thus, these new compositions in addition to containing epoxy resin as generally described above and in more detail below, and the reactive diluents set out above, include small but effective amounts of both a phenolic accelerator and a catalytic hardener. At the same time, it will also be understood that other resin compositions which may be preferable for certain purposes, although not matching the electrical and physical properties of those of the description just above, may be used in the practice of this invention with the assurance that the new results and advantages of this invention will be consistently obtained in strict compliance with the teachings herein.

Broadly and generally described then, the present invention is a thermosetting resin composition which has superior thermal stability and consists essentially of between about 50% and 95% of a 1,2 epoxy resin having at least two epoxide groups per molecule, between about 3% and 33% of a reactive diluent selected from the group recited above, and containing small but effective amounts of both a phenolic accelerator and a catalytic hardener which is neither a metal halide nor a compound containing a metal-halogen bond, that is, it is a labile halogen-free catalytic hardener or, in other words, a catalytic hardener having only metallic element-to-oxygen primary valence bonds. Further, the phenolic accelerator will be present in amount between 0.1 and 15% on the basis of the epoxy resin and the catalytic hardener will be in amount between 0.025% and 5% on the same basis when it is a metal acetylacetonate having only metallic element-to-oxygen primary valence bonds, and a 0.05% to 10% when it is an organic titanate having only metallic element-to-oxygen primary valence bonds.

Similarly, generally described in its article of manufacture aspect, this invention comprises an elongated conductor, a tape wrapped on a conductor, the tape being impregnated with the thermosetting resin composition as defined in the paragraph just above. In another form, the article of manufacture is the elongated conductor with the thermosetting resin composition of the paragraph just above as a coating on the conductor.

DETAILED DESCRIPTION OF THE INVENTION

Figure 1:
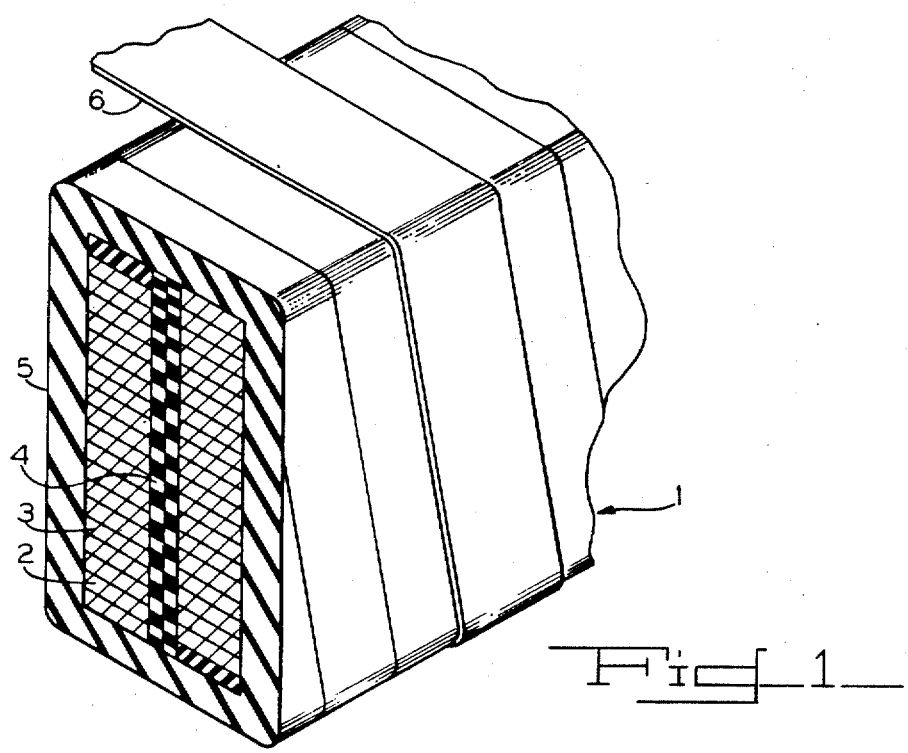
FIG. 1 of the drawings is a typical conductor bar 1 having a plurality of conductor turns 2 insulated from each other by turn insulation 3 in the usual manner has arrays of conductors separated by strand separators 4. Wrapped around the armature winding bar is ground insulation 5 or a plurality of layers of mica paper tape 6, coated and impregnated with the resin composition of this invention.

As indicated above, one has a comparatively wide variety of materials from which to choose in practicing this invention. Thus, the new results and advantages generally can be consistently obtained through the use of any thermosetting epoxy resin of the above described general class of admixtures thereof. Included among those suitable or especially desirable in the practice of this invention are bisphenol A diglycidyl ether epoxy resins (such as those sold under the trademarks EPON 826 and EPON 828 by Shell Chemical Co.). Other liquid resins of this formulation (such as those marketed under the trademarks DER 330, 331 and 332 by Dow Chemical Company, Epi-REz 508, 509, and 510 by Celanese Corporation and Araldite 6004, 6005 and 6010 by Ciba-Geigy). Still other suitable resins of this type are epoxy novolac resins (such as DEN 431 and DEN 438 of Dow Chemical Company and Epi-Rez SU-2.5 of Celanese Corp.), halogenated epoxy resins (such as Araldite 8061 of Ciba-Geigy) and cycloaliphatic epoxy resins (such as ERL 4206, 4221, 4221E, 4234, 4090 and 4289 of Union Carbide and Araldite CY182 and 183 of Ciba-Geigy).

The hardener for the chosen epoxy resin, or mixtures of resins, generally consists of a mixture of a metal acetylacetonate or an organic titanate and a phenolic accelerator wherein the phenolic accelerator is present in quantities less than 15% by weight of the epoxy resin. Among the phenolic accelerators which can be effectively used in this invention are bisphenol A (i.e., 2,2-bis(4-hydroxyphenyl)propane), pyrogallol, dihydroxydiphenyls as well as ortho-, meta-, and para-hydroxybenzaldehydes (such as salicylaldehyde), catechol, resorcinol, hydroquinone, and phenol-formaldehyde, cresol-formaldehyde and resorcinol-formaldehyde condensates. Examples of other phenolic accelerators suitably employed in this invention also include halogenated phenols such as ortho-, meta-, and para-chlorophenols or bromophenols, and ortho-, meta-, and para-nitrophenols. Desirably, the phenolic accelerator is present in concentrations between 0.1 and 15% by weight of the epoxy resin with optimum cure rates being produced with phenolic accelerator concentrations between 0.5% and 10% by weight of the epoxy resin.

The metal acetylacetonates of the new resin compositions of the present invention can be characterized by the following structural formula:

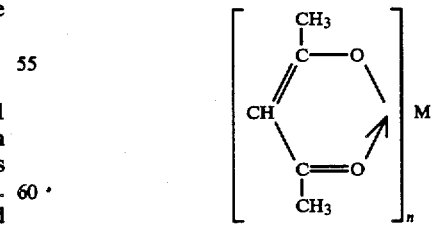

where M is a metal ion and n is 1 to 4 corresponding to the valence number of the metal ion. Included within the scope of the invention are metal acetylacetonates in which one or more hydrogen atoms of the methyl or methylene groups are substituted by a halogen atom or by an alkyl, aryl, or an alkaryl substituent. An example of a halogen-substituted metal acetylacetonate is a metal hexafluoroacetylacetonate or trifluoracetylacetonate. An example of an alkyl-substituted acetylacetonate is dipivaloylethane in which the three hydrogen atoms on each of the methyl groups are substituted with a methyl group. The catalytic hardeners of the present invention should not be confused with similar compositions containing a labile halogen atom. In the present compositions, the halogens, if present, are attached directly to a carbon atom of the methylene or methyl groups and are therefore extremely stable. Labile halogen atoms in epoxy resin curing agents normally form halogen acids, and the presence of such an ionic constituent in the cured resin would raise many problems, including poor electrical properties.

Metal acetylacetonates in which the metal is aluminum, titanium, zinc or zirconium are a particularly preferred class of metal acetylacetonates within the scope of the invention. However, essentially any metallic acetylacetonate may be used, including those of aluminum, barium, beryllium, cadmium, calcium, cerous, chromic, cobaltic, cobaltous, cupric, ferric, ferrous, gallium hafnium, indium, lead, lithium, magnesium, manganic, manganous, molybdenum, molybdenyl, nickel, palladium, platinum, potassium, rhodium, rubidium, ruthenium, sodium, strontium, thallium, thorium, titanium, tungstyl, uranyl, vanadium, vanadyl, zinc, and zirconium, acetylacetonates of the rare earth elements, scandium, cerium, yttrium, lanthanum, praseodymium, neodymium, samarium, europium, gadolinium, terbium, dysprosium, holmium, erbium, thulium, ytterbium, and lutetium are known and can reasonably be expected to be useful in the practice of the present invention.

The metal acetylacetonates are used in small catalytic quantities from 0.025 to 5.0 percent, based upon the weight of the epoxy resin. Optimum results have been achieved with from 0.05 to 3.0 percent. It is important to note that the acetylacetonates of the new resin compositions of this invention are catalytic hardeners, which do not in a significant way become a part of the hardened epoxy molecule as do curing agents added in much larger or near stoichiometric amounts.

The organic titanate added to the epoxy resin to assist the phenolic accelerator in hardening the epoxy resin preferably is a chelated titanate such as acetylacetonate titanate, lactate titanate, triethanolamine titanate, polyhydroxystearate titanate, a glycolate titanate (e.g., tetraoctylene glycol titantate containing approximately 7.8% Ti and sold under the trademark Tyzor OG by E. I. DuPont DeNemours & Co. or di-n-butyl hexylene glycol titanate), or a chelate stabilized with a nitrogen containing polymer (e.g., Tyzor WR sold by E. I. DuPont DeNemours & Co.). By use of chelated titanates, the thermosetting resin can be employed in areas having a substantial water content in the ambient atmosphere. When the thermosetting resin is applied in an atmosphere having substantially zero humidity, non-chelated titanates such as tetraisopropyl titanate, tetrabutyl titanate, polymerized tetrabutyl titanate, and tetrakis (2-ethylhexyl) titanate also can be employed for the epoxy resin hardener. Chelated titanates, such as acetylacetonate titanate, tetraoctylene glycol titanate and di-n-butyl hexylene glycol titanate, however, are preferred for the epoxy resin hardener to provide a homogeneous mixture while exhibiting resistance to hydrolyzation under humid conditions. In general, the chosen titanate should be present in the mixture, in a concentration between 0.05 and 10% by weight of the epoxy resin with optimum cure rates generally being obtained utilizing titanate concentrations between 0.2% and 5% by weight of the epoxy resin.

The foregoing organic titanates suitable for use in the thermosetting epoxy resin of this invention are characterized by four (4) Ti-O primary valence bonds, and one or two secondary valence bonds or chelate bonds. Because titanium has a valence of four and a coordination number of six, these organic titanates also can have four Ti-O primary valence bonds. Similar results, however, also should be obtained with organic titanates having four primary valence bonds made up of mixtures of Ti-S and Ti-O bonds. The titanate also should be substantially free of labile ionic species to produce a low dissipation factor in the cured resin.

As disclosed and claimed in the aforesaid U.S. Pat. Nos. 3,814,214 and 3,776,978, these epoxy resins are compounded in accordance with this invention with hardeners and accelerators which provide the desired cure rate and result in the end product electrical insulating and physical property characteristics that are the objective in view of the operator. The hardener for the chosen epoxy resin or mixture of resins will generally consist of a mixture of phenolic accelerator and a labile halogen-free organic titanate or metal acetylacetonate. The quantity of the phenolic accelerator will be between 0.1 and 15% by weight of the epoxy resin while the other constituent will be used in the amount of 0.025 to 5% on the same basis when it is a metal acetylacetonate and 0.05% to 10% when it is an organic titanate. While catechol is presently my preference in the practice of this invention, it would be understood that other phenolic accelerators may be used singly or in admixture in the total amount indicated above with consistently satisfactory results. Likewise, it will be understood that while I also presently prefer aluminum acetylacetonate as a catalytic hardening agent to assist the phenolic accelerator in promotion of the curing reaction, other acetylacetonates, particularly of zirconium, can be used for this purpose and likewise, further, consistently superior results can be obtained through the use of one or another or a mixture of organic titanates.

The reactive diluent which decreases viscosity of the thermosetting compositions compounded as just described above, using the epoxy resins, the hardener and the catalytic material, will be added at the time of the operator's choosing in the sequence of compounding the constituents of the mixture and will be one or another or a mixture of those particular compounds which I have discovered to be surprisingly effective in this respect. In particular, styrene, alpha-methyl styrene, an isomer or mixture of isomers of vinyl toluene, of t-butyl styrene, of divinyl benzene, and of diisoprophenyl benzene, and mixtures thereof, are the compounds of choice within the scope of this invention to produce the surprising viscosity-decreasing effects which are necessary to consistently gain the new results and advantages of this invention. The amount of this reactive diluent or combination of diluents used in the mixtures of this invention will be between about 3% and 33% of the total composition, it being my further discovery that within that range, these new results and advantages can be obtained and that beyond that range, the results are either not consistently obtainable or there are detrimental effects of another nature, particularly on the high side of the range. The properties of four resin compositions which differ only in vinyl toluene content are compared in Example 25 below in which a useful product was obtained even with 20% vinyl toluene although the heat deflection temperature was relatively low as was the reactivity, while Examples 28 and 29 involve epoxy compositions different from those of Example 25 but which contain 22% and 25% vinyl toluene and have high reactivity and excellent properties.

Those skilled in the art will gain a further and better understanding of the present invention and the new results and advantages thereof from the following illustrative, but not limiting, examples of the practice of this invention as it has actually been carried out experimentally.

EXAMPLE 1

A clear resin composition was made from EPON 828 epoxy resin, alpha-methyl styrene, aluminum acetylacetonate, and catechol. At 25° C., this composition had a viscosity less than 100 cps, its composition being 82.26 parts by weight (pbw) of the EPON 828, 10 pbw of alpha-methyl styrene, 0.45 pbw aluminum acetylacetonate, and 5.87 pbw catechol. The composition solidified to a gel in 6.6 min. at 171° C. and cured to a hard, tough, clear solid after 4 hrs. at 160° C. The cured resin product had a percent dissipation factor (DF) at 60 Hz and 10 volts per-mil of 0.197 and 0.506 at room temperature and 170° C., respectively.

EXAMPLE 2

Another resin composition the same that of Example 1 with the exception that it contained only 0.24 pbw aluminum acetylacetonate and contained more catechol (7.50 pbw) and had a 5.5 min. gel time at 171° C. On storage, the viscosity of the composition increased from 950 to 1180 cps after aging 2.5 months at room temperature. The composition cured in four hours at 160° C. to a hard, tough, clear solid having percent DF values of 0.272 and 0.409 at room temperature and 170° C., respectively.

EXAMPLE 3

Another clear resin composition was prepared using 83.92 pbw EPON 828, 10 pbw styrene, 0.23 pbw aluminum acetylacetonate, and 5.85 pbw catechol. The viscosity of this composition at 25° C. was less than 1,000 cps, and the resin had a gel time of 6.5 min. at 171° C. The viscosity of the composition increased from 880 to 1180 cps after 2.5 months storage at room temperature. The composition cured after 4 hrs. at 160° C. to a hard, tough, clear solid having percent DF values of 0.223 and 0.766 at room temperature and 170° C., respectively.

EXAMPLE 4

Using EPON 826 (82.26 pbw), t-butyl styrene (10.00 pbw), aluminum acetylacetonate (0.24 pbw) and catechol (7.50 pbw), a clear resin composition was produced of a viscosity of 1200 cps at 25° C. The composition gelled in 5 min. at 171° C. and cured after 4 hrs. at 160° C. to a hard, tough, clear solid, having percent DF values of 0.349 and 0.296 at room temperatures and 170° C., respectively.

EXAMPLE 5

Using slightly more EPON 826, (82.27 pbw), and slightly less aluminum acetylacetonate (0.24 pbw), vinyl toluene (10 pbw) and catechol (7.50 pbw), a clear resin of viscosity of 750 cps at 25° C. was made. The gel time of this resin was 4.9 min. at 171° C., and it cured after 4 hrs. at 160° C. to a hard, tough, clear solid having percent DF values of 0.376 and 0.346 at room temperatures and 170° C., respectively.

EXAMPLE 6

In another experiment like that of Examples 4 and 5, a clear resin composition was made from EPON 826 (79.99 pbw), vinyl toluene (12.5 pbw), aluminum acetylacetonate (0.22 pbw), and catechol (7.29 pbw). In this case, the composition had a 5.5 min. gel time at 171° C., and the resin cured in 4 hrs. at 160° C. to a hard, tough, clear solid, having percent DF values of 0.375 and 0.308 at room temperatures and 170° C., respectively.

EXAMPLE 7

In another experiment same as that of Example 6, except that m-diisopropenyl benzene was used in place of the vinyl toluene in formulating the composition, a viscosity of 630 cps at 25° C. was measured and the resin in 5.0 min. gelled at 171° C. and after 4 hrs. at 160° C. cured to a hard, tough, clear solid, having percent DF values of 0.218 and 0.355 at room temperature and 170° C., respectively.

EXAMPLE 8

In another experiment very much like that of Examples 6 and 7, t-butyl styrene was used instead of vinyl toluene and m-diisopropenyl benzene, the same amounts in each instance being employed, and a composition having viscosity of 980 cps at 25° C. was obtained. The resin gelled in 5.3 minutes at 171° C. and cured in 4 hrs. at 160° C. to a hard, tough, clear solid having percent DF values of 0.262 and 0.394 at room temperature and 170° C., respectively.

EXAMPLE 9

A clear, resin composition of viscosity of 1070 cps at 25° C. was prepared in mixing 84.09 pbw EPON 826, 8.0 pbw vinyl toluene, 0.23 pbw aluminum acetylacetonate, and 7.68 pbw catechol. In 4.5 min. at 171° C., this composition gelled and it cured in 4 hrs. at 160° C. to a hard, tough, clear solid having percent DF values of 0.020 and 0.412 at room temperature and 170° C., respectively.

EXAMPLE 10

Another resin composition of 760 cps at 25° C. was made with 85.32 pbw EPON 826, 10 pbw vinyl toluene, 0.22 pbw aluminum acetylacetonate, and 4.46 pbw catechol. At 171° C., this resin composition gelled in 7.3 min. and it cured after 4 hrs. at 160° C. to a hard, tough, clear solid having percent DF values of 0.197 and 9.528 at room temperature and 170° C., respectively.

On storage for 5.5 months at room temperature, the viscosity of the composition was found to have increased from 760 to 980 cps.

EXAMPLE 11

Another clear resin composition of 880 cps viscosity at 25° C. was made of 77.79 pbw EPON 826, 12 pbw vinyl toluene, and 5 pbw catechol, together with 5 pbw of a phenol novolac resin having a Ball and Ring softening point of 100° C. to 107° C., and aluminum acetylacetonate (0.21 pbw). The gel time of this resin composition was 8.9 min. at 171° C., and the composition cured after 4 hrs. at 160° C. to a hard, clear, tough solid having percent DF values of 0.273 and 0.609 at room temperature and 170° C., respectively.

EXAMPLE 12

By mixing 76.25 pbw EPON 826, 12 pbw vinyl toluene, 0.25 pbw aluminum acetylacetonate, 4 pbs catechol and 7.5 pbw of a phenol novolac resin having a Ball and Ring softening point of 100° C. to 107° C., a clear composition of viscosity of 980 cps at 25° C. was obtained. This resin gelled after 9.1 min. at 171° C. and cured after 4 hrs. at 160° C. to a hard, tough, clear solid having percent DF values of 0.394 and 1.11 at room temperature and 170° C., respectively.

EXAMPLE 13

An experiment to test the effectiveness of a variety of different diluents to reduce viscosity, epoxy resin composition containing EPON 826 and 0.22% to 0.25% aluminum acetylacetonate and 7.1% to 8.3% catechol were prepared and in addition contained diluents of this invention, epoxy diluents used in the prior art, as well as diallyl phthalate, diisopropylnaphthalene, and diethyl phthalate in varying amounts and comparisons were made to four polyester resins which were catalyzed with 1% dicumyl peroxide. The actual amount of EPON 826 used in the formulation of each of these test compositions was the difference between 100% and the total percentage of the other constituents thereof, i.e., EPON 826 was the balance in each case and so varied from 68.60% to 83.54%. It should be understood that although the polyester resins were made with maleic anhydride, the polyester resin formed was a fumarate since the maleate isomerizes during polyester synthesis. The polyester resins of this series contained vinyl toluene. Weight loss measures at 200° C. were made on 10 gram, 2.5 in. diameter discs which were aged in a forced air circulating oven. The results of this experiment are set forth in Table I below.

The superiority of the resin compositions of this invention over the prior art in respect both to electrical properties at 170° C. and to thermal stability is evident from this tabulated data where low dissipation factors and low weight loss are preferred properties for electrical insulation.

TABLE I

|  | % DF (170° C.) | % Weight Loss (28 days at 200° C.) |
|---|---|---|
| Diluents (Present Invention) | | |
| 10.0% vinyl toluene | 0.346 | 3.27 |
| 12.5% vinyl toluene | 0.308 | 3.60 |
| 10.0% t-butyl styrene | 0.296 | 3.43 |
| 12.5% t-butyl styrene | 0.398 | 3.58 |
| 15.0% t-butyl styrene | 0.508 | 4.36 |
| 10.0% m-diisopropenyl benzene | 0.350 | 3.86 |
| 12.5% m-diisopropenyl benzene | 0.355 | 4.48 |
| Epoxy Diluents (Prior Art) | | |
| 9.14% butyl glycidyl ether | 1.577 | 3.76 |
| 9.14% 2-ethylhexyl glycidyl ether | 5.788 | 4.59 |
| 22.85% t-butyl phenyl glycidyl ether | 2.056 | 5.24 |
| 22.85% neopentylglycol diglycidyl ether | 2.173 | 5.41 |
| 22.85% cyclohexane dimethanol diglycidyl ether | 1.114 | 6.51 |
| Other Diluents Tested | | |
| 10.0% diallyl phthalate | 3.51 | 14.13 |
| 15.0% diallyl phthalate | 10.693 | 15.80 |
| 10.0% diisopropyl naphthalene | 0.506 | 13.59 |
| 10.0% diethyl phthalate | 2.002 | 12.32 |
| Polyester Resins | | |
| No. 1 (adipic acid, maleic anhydride esterified with diethylene glycol, vinyl toluene monomer) | >50 | 13.15 |
| No. 2 (phthalic anhydride, maleic anhydride esterified with propylene glycol, vinyl toluene monomer) | 1.357 | 5.67 |
| No. 3 (isophthalic acid, maleic anhydride esterified with propylene glycol, vinyl toluene monomer) | 1.302 | 8.20 |
| No. 4 (phthalic anhydride, maleic anhydride esterified with the reaction product of bisphenol A with propylene oxide, vinyl toluene monomer) | 1.624 | 5.32 |

EXAMPLE 14

A clear, low viscosity resin was made from cycloaliphatic epoxy resin which is marketed by Union Carbide Plastics Company under the designation ERL 4221. This resin in the amount of 84.61 pbw was mixed with 12 pbw vinyl toluene, 0.85 pbw tetraoctylene glycol titanate and 2.54 pbw resorcinol. The resin composition cured to a tough, hard solid after 15 hrs. at 160° C.

EXAMPLE 15

Using the epoxy resin of Example 14, in amount of 83.81 pbw, 12 pbw vinyl toluene, 0.84 pbw tetraoctylene glycol titanate and 3.35 pbw of a phenol novolac resin having a Ball and Ring softening point of 100° C. to 107° C. resulted in a clear, low viscosity resin which in 15 hrs. at 160° C. cured to a tough, clear, hard solid.

EXAMPLE 16

Using 77.87 pbw EPON 828 epoxy resin, 12.00 pbw vinyl toluene, 2.34 pbw tetraoctylene glycol titanate and 7.79 pbw of a phenol novolac resin having a Ball and Ring softening point of 100° C. to 107° C., a clear, low viscosity resin composition was produced which cured to a tough, clear, hard solid after 15 hrs. at 160° C.

EXAMPLE 17

A clear low viscosity resin composition was made from EPON 828 epoxy resin (74.57 pbw), 12 pbw vinyl toluene, 2.24 pbw tetraoctylene glycol titanate and 11.19 pbw of a phenol novolac resin as described in the foregoing Examples 15 and 16. On baking at 160° C. for 15 hrs., this resin cured to a clear, tough, hard solid.

EXAMPLE 18

Another clear low viscosity resin composition was made from the epoxy resin described in Example 14, used in the amount of 83.81 pbw with 12 pbw vinyl toluene, 0.84 pbw zirconium acetylacetonate and 3.35 pbw bisphenol A. The resin composition cured to a tough, hard, clear solid after 15 hrs. at 160° C.

EXAMPLE 19

Still another low viscosity resin composition was made from the resin of Example 16 used in the amount of 84.61 pbw with 12.0 pbw vinyl toluene, 0.85 pbw zirconium acetylacetonate and 2.54 pbw catechol. In 15 hrs. at 160° C., this resin composition cured to a hard, tough, clear solid.

EXAMPLE 20

A brick red low viscosity resin composition was made from the epoxy resin of Example 16 used in the amount of 76.19 pbw with 12.0 pbw vinyl toluene, 2.29 pbw tetrabutyltitanate and 9.52 pbw of the phenol novolac resin of Examples 15–17. This resin composition cured to a tough, hard, opaque solid after 15 hrs. at 160° C.

EXAMPLE 21

Again using the resin of Example 16, in the amount of 76.19 pbw, a clear low viscosity resin composition was provided with 12.0 pbw vinyl toluene, 2.29 pbw titanium acetylacetonate and 9.52 pbw of the phenol novolac resin of Examples 15–17. This resin composition cured to a tough, clear, hard solid after 15 hrs. at 160° C.

EXAMPLE 22

An attempt was made to make a mica paper tape from the semi-solid epoxy novolac DEN 438 (84.89 pbw), tetraoctyleneglycol titanate (2.55 pbw) and resorcinol (5.09 pbw). However, resin penetration of the mica paper was not complete even after 8 hrs. at 50° C.

A mica paper tape was successfully made from DEN 438 (84.89 pbw), tetraoctylene glycol titanate (2.55 pbw), resorcinol (5.09 pbw) and vinyl toluene (7.47 pbw). The resin fully penetrated the mica paper within 5 hrs. at 50° C. The resin itself or the mica paper impregnated with the resin cured after 8–15 hrs. at 160° C. to a hard, tough solid.

EXAMPLE 23

An attempt was made to make a mica paper tape from DEN 438 (85.62 pbw), a tetraoctyleneglycol titanate (2.57 pbw) and 4.28 pbw of a phenol novolac resin having a Ball and Ring softening point of 100°–107° C. However, tape preparation was not successful because the resin did not fully penetrate through the mica paper even after 8 hrs. at 50° C.

A mica paper tape was successfully made from DEN 438 (85.62 pbw), tetraoctyleneglycol titanate (2.57 pbw), 4.28 pbw of the phenol novolac described in the above paragraph and vinyl toluene (7.53 pbw). The mica paper was fully impregnated with the resin within 5 hrs. at 50° C. The resin by itself or the mica paper preimpregnated with the resin cured after 8–15 hrs. at 160° C. to a hard, tough solid.

EXAMPLE 24

An attempt was made to make a mica paper tape from the epoxy novolac DEN 438 (81.84 pbw), tetraoctyleneglycol titanate (2.45 pbw) and 8.18 pbw of the phenol novolac described in Example 23. The resin did not fully penetrate through the mica paper even after 8 hrs. at 50° C., leaving many dry areas in the mica paper.

A mica paper tape was successfully made from DEN 438 (81.84 pbw), tetraoctyleneglycol titanate (2.45 pbw), 8.18 pbw of the phenol novolac described in Example 23 and vinyl toluene (7.53 pbw). The resin fully penetrated the mica paper leaving no dry areas after 5 hrs. at 50° C. hot soak. The resin cured after 8–15 hrs. at 160° C. to a hard, tough solid.

EXAMPLE 25

Four resins were made from a master batch made with 90.88 pbw EPON 826, 3.42 pbw catechol and 5.70 pbw of a phenol novolac resin of Examples 15–17. The master batch was diluted in the vinyl toluene and aluminum acetylacetonate to a composition containing 12.50% vinyl toluene and 0.25% aluminum acetylacetonate (resin No. 25A). Resin No. 25B had a composition of 15.00% vinyl toluene, 0.25% aluminum acetylacetonate and 84.75% master batch. Resin No. 25C had a composition of 17.50% vinyl toluene, 0.25% aluminum acetylacetonate and 82.25% master batch. Resin No. 25D had a composition of 20.00% vinyl toluene, 0.25% aluminum acetylacetonate and 79.75% master batch. The gel times of these resins at 171° C. were 18.4, 20.4, 23.0 and 24.8 min. for 25A, 25B, 25C and 25D, respectively. The heat deflection temperature values at 264 psi using ASTM test method D648-72 were 73, 74, 73 and 63° C., respectively, after a 4.0 hrs. at 160° C. cure. All four resins cured to hard, clear, tough solids after a 4.0 hrs. at 160° C. cure.

EXAMPLE 26

A clear resin having a viscosity of 660 cps at 25° C. and a gel time of 13.9 min. at 171° C. was made from 50.0 pbw of the epoxy novolac DEN 438, 26.75 pbw of the cycloaliphatic epoxy resin ERL 4221, 3.0 pbw of a phenol novolac resin having a Ball and Ring softening pont of 100° C. to 107° C., 0.25 pbw of aluminum acetylacetonate and 20.00 pbw of vinyl toluene. The resin cured to a tough, hard solid after 4.0 hrs. at 160° C. The viscosity of the resin increased from 660 to 720 cps at 25° C. after 3.0 months at room temperature.

EXAMPLE 27

A clear resin was made which was identical to Example 26 except the 20.00 pbw of vinyl toluene was replaced with 20.00 pbw of para-methyl styrene. The viscosity of this resin was 610 cps at 25.0° C. which increased to 690 cps after 3.0 months aging at room temperature. The gel time of the resin was 14.0 min. at 171° C. and cured to a tough solid after 4.0 hrs. at 160° C.

EXAMPLE 28

A clear resin having a viscosity of 570 cps at 25° C. and a gel time of 9.6 min. at 171° C. was made from 50.00 pbw of the epoxy novolac DEN 438, 23.75 pbw of the cycloaliphatic epoxy resin ERL 4221, 4.00 pbw of a phenol novolac resin having a Ball and Ring softening point of 100° C. to 107° C., 0.25 pbw of aluminum acetylacetonate and 22.00 pbw of vinyl toluene. ERL 4221 is 3,4-epoxycyclohexylmethyl—(3,4-epoxy) cyclohexane carboxylate sold by Union Carbide Chemical Co. The resin cured to a tough product after 4.0 hrs. baking at 160° C. and showed nearly no change in viscosity and 3 months aging at room temperature.

EXAMPLE 29

A clear resin having a viscosity of 470 cps at 25.0° C. and a gel time of 8.0 min. at 171° C. was made from 50.00 pbw of DEN 438 epoxy novolac resin, 19.75 pbw of ERL 4221E cycloaliphatic epoxy resin, 5.0 pbw of phenol novolac resin having a Ball and Ring softening point of 100°–107° C., 0.25 pbw of aluminum acetylacetonate and 25.00 pbw of vinyl toluene. The resin cured to a hard, tough solid having a heat deflection temperature value at 264 psi of 122° C. and %DF values of 0.121 and 1.048 at 25° C. and 170° C., respectively, after a 15.0 hrs. at 160° C. cure. The viscosity increased from 470 to 570 cps after 3.0 months aging at room temperature. This composition had superior thermal stability as evidenced by weight loss of 1.11% in 28 days at 200° C.

EXAMPLE 30

A very low viscosity, high reactivity resin having a gel time of 1.6 min. at 171° C., was made from 82.75 pbw of the cycloaliphatic epoxy resin ERL 4221E, 2.0 pbw of a phenol novolac resin having a Ball and Ring softening point of 100°–107° C., 0.25 pbw of aluminum acetylacetonate and 15.0 pbw vinyl toluene. The viscosity was 80 cps at 25° C. which only increased to 110 cps after 3.0 months at room temperature. The resin cured after 15.0 hrs. at 160° C. to a hard, tough solid having a heat deflection temperature at 264 psi of 153° C. and %DF values of 0.170 and 1.249 at room temperature and 170° C., respectively.

As a generalization, the excellent dissipation factors of the thermosetting resins of this invention as represented by the compositions of the foregoing examples attest to the suitability of these invention results for uses in electrical insulation applications. The resins as hard, tough solids have excellent electrical properties over the range from 25° C. to at least 170° C., in their cured form, being substantially free of ionic species which tend to reduce the effectiveness of the insulations at elevated temperatures and they are also characterized by good thermal stability.

When glass fabric, mica paper, mica flake tape of the like is impregnated with the resinous compositions of this invention, the resulting sheets or tapes can be wound by hand or by machine as ground or other insulation on electrical components such as the conductor bar shown in FIG. 1 of the drawings accompanying this specification. Thus a typical conductor bar 1 having a plurality of conductor turns 2 insulated from each other by turn insulation 3 in the usual manner has arrays of conductors separated by strand separators 4. Wrapped around the armature winding bar is ground insulation 5 or a plurality of layers of mica paper tape 6, coated and impregnated with the resin composition of this invention. In preparing such an insulated conductor bar, the entire assembly is covered with a sacrifice tape and placed in a pressure tank and evacuated. There is no need in this process to remove solvents from the present resin compositions, the only purpose of the evacuation being to remove entrapped air. After vacuum treatment, molten bitumen, or other heated transmitting fluid is introduced into the tank under pressure to cure the resin in well known manner. Upon completion of the curing step, the bar winding is removed from the bath, cooled and the sacrifice tape is removed.

Figure 2:
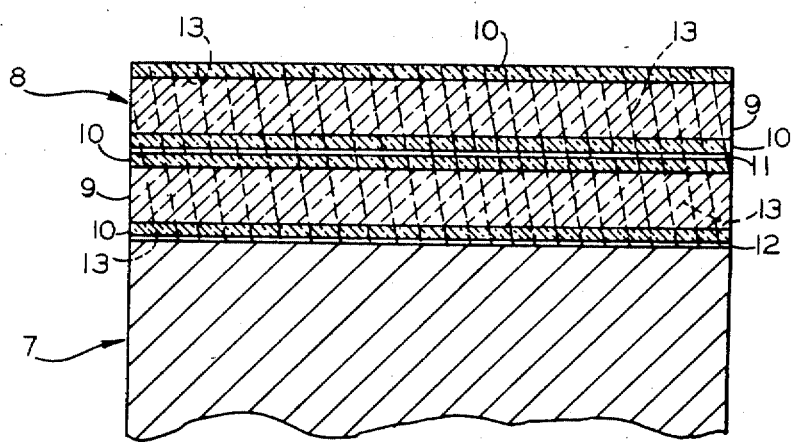
FIG. 2 is an enlarge frangmentary sectional view of an electrical conductor 7 provided with vacuum-impregnated insulation 8 in accordance with this invention.

FIG. 2 is an enlarged fragmentary sectional view of an electrical conductor 7 provided with vacuum-impregnated insulation 8 in accordance with this invention. Thus, there are two layers of mica paper 9 with reinforcement or backing material 10 and a small space 11 between these layers and another (12) between the inner tape layer and conductor 7. Spaces 11 and 12 and the tape layers themselves are filled by the resinous composition as depicted with cross-linking indicated by reference character 13. Such complete filling of this insulating structure and the void-free nature of the conductor covering are attributable to the low viscosity of the novel impregnating composition and to the fact that it contains no solvent to be removed during the curing operation.

It will be understood from the foregoing that as an alternative to the procedure just described, the resin composition of this invention can be applied to such fabric or tape or paper prior to the application thereof to the conductor to be insulated thereby, using the standard impregnation and application techniques, by employing the novel compositions of this invention instead of the solvent containing compositions of the prior art so as to produce void-free insulation structures. Thus, in this case, as well as that described just above, the novel results and advantages of this invention are obtained through the use of reactive diluent in place of solvents employed heretofore to accomplish the necessary impregnating and penetration of the fabric, paper or tape material, in either preimpregnation or vacuum-pressure impregnation application procedures.

Throughout this specification and the appended claims, whenever percentage or proportion is recited, reference is to the weight basis unless otherwise expressly stated.

Having thus described the present invention in compliance with applicable statutory requirements, I state that what I desire to secure by Letters Patent is defined in what is claimed.

What is claimed:

1. An article of manufacture comprising an elongated conductor, a tape wrapped on said conductor, said tape being impregnated with a thermosetting resin composition having superior thermal stability consisting essentially of between about 50% and about 95% of 1,2 epoxy resin having at least two epoxide groups per molecule, between about 3% and about 33% of a reactive diluent selected from the group consisting of styrene, alpha-methyl styrene, an isomer or mixture of isomers of vinyl toluene, of t-butyl styrene, of divinyl benzene, and of diisopropenyl benzene, and mixtures thereof, and small but effective amount of phenolic accelerator and a labile halogen-free catalytic hardener.

2. An article of manufacture comprising an elongated conductor coated with a thermosetting resin composition having superior thermal stability consisting essentially of between about 50% and about 95% of 1,2 epoxy resin having at least two epoxide groups per molecule, between about 3% and about 33% of a reactive diluent selected from the group consisting of styrene, alpha-methyl styrene, an isomer or mixture of isomers of vinyl toluene, of t-butyl styrene, of divinyl benzene, and of diisopropenyl benzene, and mixtures thereof, and small but effective amount of a phenolic accelerator and a labile halogen-free catalytic hardener.

* * * * *